United States Patent [19]

Sacco

[11] Patent Number: 4,860,841
[45] Date of Patent: Aug. 29, 1989

[54] DEVICE FOR MANEUVERING OF TRAILERS

[76] Inventor: Angelo Sacco, Rue Garde Dieu 21, B-4900 Liege, Belgium

[21] Appl. No.: 153,435

[22] Filed: Feb. 8, 1988

[30] Foreign Application Priority Data

Feb. 12, 1987 [BE] Belgium .............................. 08700111

[51] Int. Cl.$^4$ .............................................. B60S 9/16
[52] U.S. Cl. .................................... 180/13; 180/14.2; 180/904; 180/19.1; 280/DIG. 11; 280/3
[58] Field of Search .................. 180/6.2, 6.24, 11, 12, 180/13, 19.1, 19.2, 904; 280/DIG. 11, 3

[56] References Cited

U.S. PATENT DOCUMENTS

| | | | |
|---|---|---|---|
| 3,356,172 | 12/1967 | Peekham et al. | 180/19.2 |
| 3,770,070 | 11/1973 | Smith | 180/19.1 |
| 3,783,960 | 1/1974 | Felix | 180/19.2 |
| 3,861,482 | 1/1975 | Stephens et al. | 180/19.1 |

Primary Examiner—Charles A. Marmor
Assistant Examiner—Donn McGiehan
Attorney, Agent, or Firm—Fishman, Dionne & Cantor

[57] ABSTRACT

A motorized device for aiding the maneuvering of trailers subsequent to detachment from the towing vehicle is presented which comprises a shaft attachable to the drawbar of the trailer and which is adjustable for height. At least one wheel is mounted at the end of the shaft with the axis of the wheel being perpendicular to the shaft. At least one driving device for driving the wheel in rotation about its axis and a swivelling device for swivelling the wheel are also provided.

5 Claims, 2 Drawing Sheets

DEVICE FOR MANEUVERING OF TRAILERS

SUMMARY OF THE INVENTION

In accordance with the present invention, the maneuvering device essentially comprises a shaft arranged on the drawbar of the trailer, the shaft being adjustable for height. At least one wheel is mounted at the end of the shaft with the axis of the wheel being perpendicular to the shaft. The present invention also includes at least one driving means for driving the wheel in rotation about its axis and means for swivelling the wheel.

In accordance with a first embodiment of the present invention, the driving means for driving the wheel comprises an electric or internal combustion motor and a speed reducer, both of which are mounted on the top free end of the shaft so as to ensure the transmission of the rotary movement to the wheel. In this first embodiment, the shaft consists of a hollow casing adjustable for height terminating at, for example, a simple rack and pinion assembly in which a pin is located which transmits the rotary movement of the driving means to at least one wheel.

Because of the height adjustability, the wheel may be raised or lowered in relation to the drawbar of the trailer depending upon whether the operator has hooked the trailer onto the towing vehicle; or whether the operator has the intention of moving it independently of the towing vehicle. In this embodiment, the wheel swivelling means comprises a handle or a manual steering wheel arranged, for example, on the casing of the driving motor.

In accordance with another embodiment of the present invention, the wheel driving means comprises an electric or an internal combustion motor and a speed reducer, both of which are mounted on the axis of the wheel. In this second embodiment, the shaft is adjustable for height and is able to slide in a sleeve integral with the drawbar of the trailer.

BACKGROUND OF THE INVENTION

This invention relates to a motorized device for aiding the maneuvering of trailers such as caravans, horse box or boat trailers and the like subsequent to detachment of the trailers from the towing vehicle.

Conventional trailers generally comprise a retractable device which aids in manual maneuvers after the trailers are detached from the towing vehicle. Such devices generally comprise a wheel mounted on a pivoting shaft or on a pivoting fork. However, it will be appreciated that as the weight and dimensions of a trailer becomes relatively large, it becomes difficult to steer the trailers by hand and to push them for the purpose of changing their position. This task becomes all the more arduous when the ground is uneven.

Accordingly it is an object of the present invention to provide a device for trailer maneuvering which particularly aids the maneuvering of trailers subsequent to their detachment from the towing vehicle.

It is another object of the present invention to provide a trailer maneuvering device which comprises at least one driving motor and which aids the operator in movements from place to place, without the operator having to exert considerable muscular effort.

Still another object of the present invention is to provide a simple maneuvering device of strong construction which is particulary well suited to the trailers on which it is mounted.

Preferably, the means for swivelling the wheel may comprise a motor which is integral with the sleeve; the movement of rotation being transmitted via a means of transmission and reduction to the shaft fitted with a means of longitudinal engagement. In this embodiment, a remote control enables the swivelling of the wheel and the turning thereof to be controlled in such a manner that the trailer may be easily steered.

Also in a preferred embodiment, at least one of the driving means comprises an additional power take-off which permits various accessories like a hydraulic pump, a winch or the like to be coupled thereto.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike and the several Figures.

DESCRIPTION OF THE PREFERRED EMBODIMENT

Figure 1:
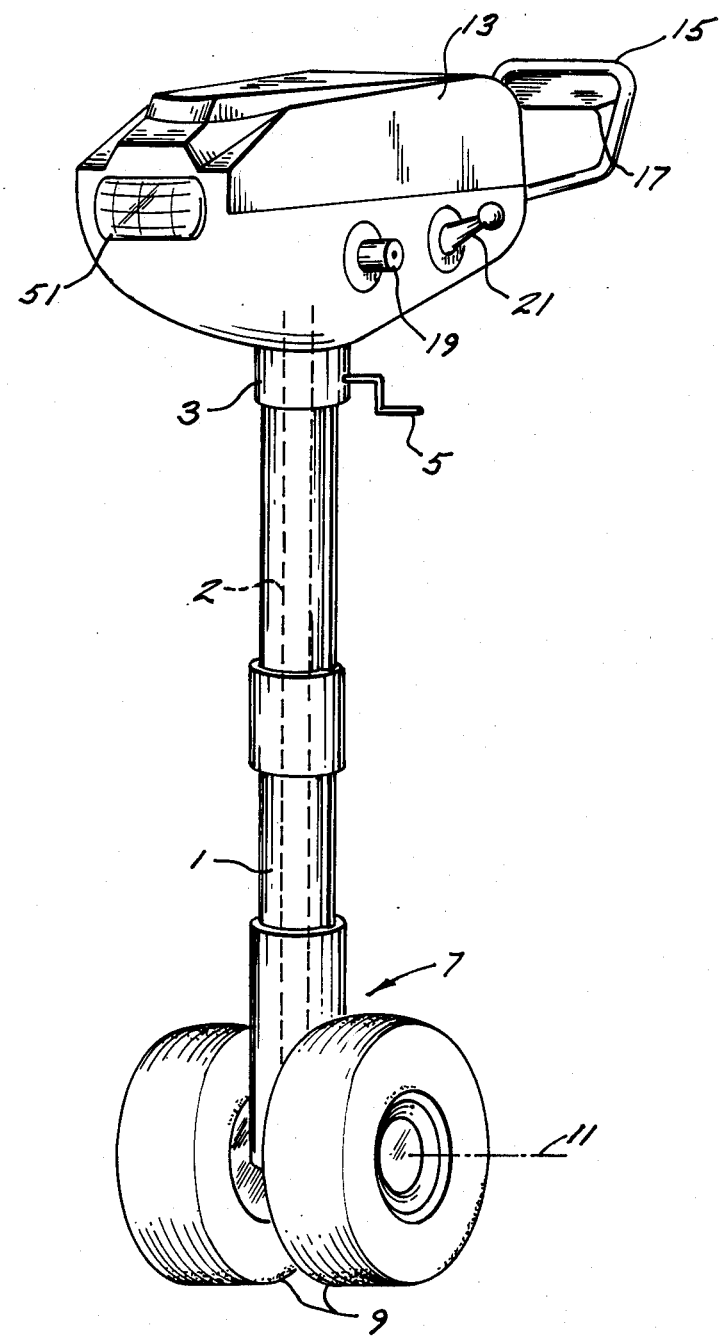
FIG. 1 is a perspective view of a first embodiment of a trailer maneuvering device of the present invention.

Referring first to FIG. 1, a maneuvering device for trailers is shown in accordance with a first embodiment of the present invention. This maneuvering device comprises a hollow casing 1 mounted on the drawbar of a trailer (not shown) such as a caravan, boat trailer or the like. Hollow casing 1 is slidably received in a sleeve 3 which is integral with the drawbar (not shown) and which is adjusted for height by a conventional rack and pinion assembly 5 shown diagrammatically mounted on casing 1. The bottom end 7 of hollow casing 1 has two wheels 9 mounted on a common axis 11 substantially perpendicular to casing 1.

Driving means such as an internal combustion motor followed by a reducer, combined together in a casing 13, is arranged on the top of casing 1. The driving means transmits its turning movement to a pin 2 mounted inside hollow casing 1 and then, in accordance with suitable gearing, movement is transmitted to wheels 9.

The maneuvering device of the present invention further comprises means for swivelling wheels 9 in order to be able to steer the trailer in a desired direction. In the case of FIG. 1, this swivelling means is preferably composed of a handle 15 integral with casing 13 which transmits the pivoting movement exerted manually by the operator to the wheels 9.

Preferably, the maneuvering device of the present invention is also provided with a safety device which immediately stops the driving means as soon as the operator is no longer in a position to control the device. This safety device may be composed of a conventional declutching lever 17 which the operator must hold at the same time as the handle 15 in a known manner.

The maneuvering device of the present invention may also include an auxiliary power take-off 19 which may be engageable with the aid of a lever 21. Power take-off 19 permits various accessories to be coupled thereto. For example, such accessories may consist of a hydraulic pump to work a hydraulic installation, such as a tipping trailer; or a traction winch intended, for example, for boat trailers or trailers intended for vehicle recovery.

Figure 2:
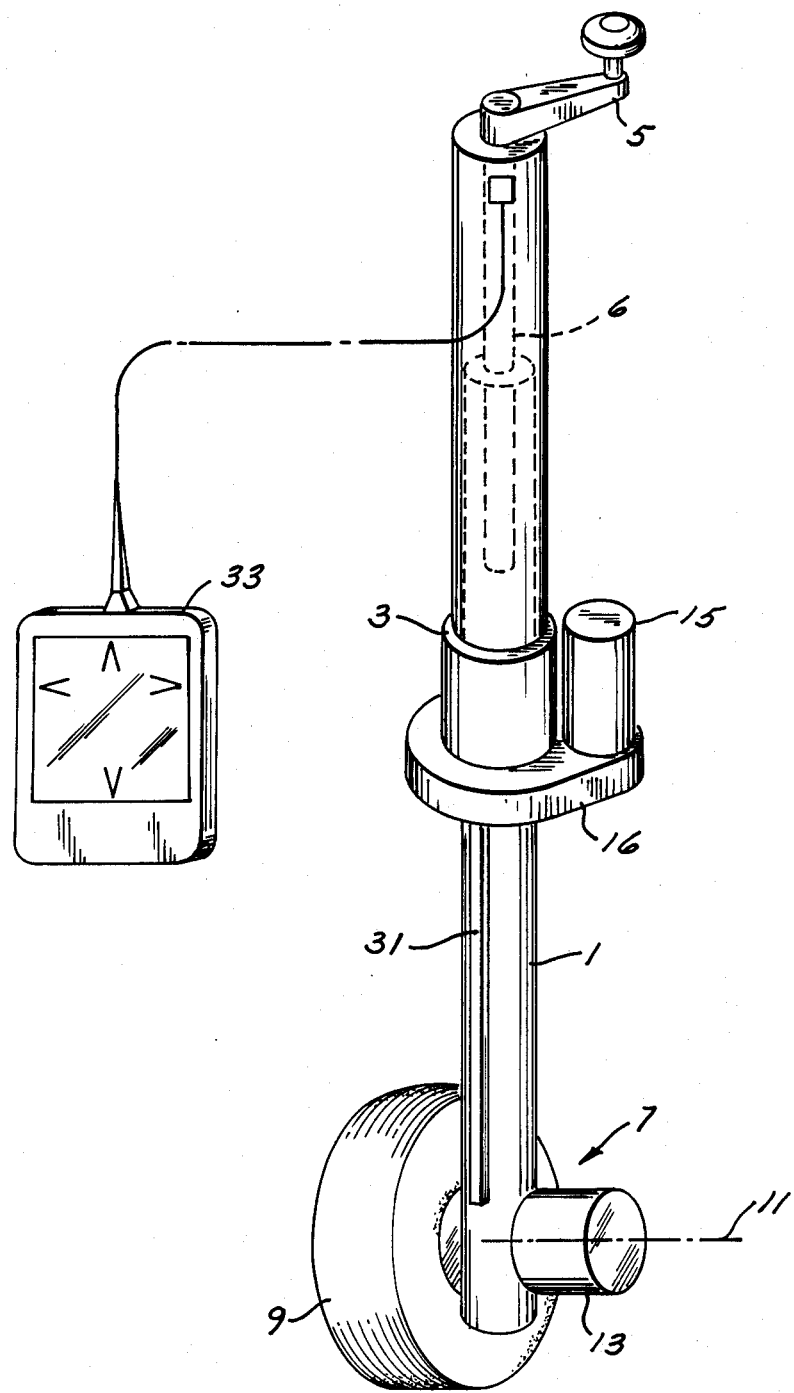
FIG. 2 is a perspective view of a second embodiment of a trailer maneuvering device of the present invention.

In the embodiment shown in FIG. 2, a shaft 1 is arranged in a slideable and adjustable manner in a sleeve 3 made integral with the drawbar 16 of a trailer. Preferably, height adjustment of shaft 1 is made with the aid of a lever 5 whose rotation enables a threaded rod 6 to mesh with an internal thread made in shaft 1.

The driving means 13 for the wheel 9 in rotation about its axis 11 is preferably mounted on the end of shaft 1; preferably substantially on the same axis 11 as that of wheel 9. It will be appreciated that the swivelling means for the wheel 9 may also comprise a handle of the abovementioned type. However, it may also comprise a motor 15, preferably an electric motor, followed by a speed reducer which is integral with sleeve 3 and which acts on a longitudinal key 31. Key 31 permits a reducing action over the whole length of shaft 1, that is if shaft 1 is adjusted for height. Of course, other means may also be provided such as a splined shaft together with a toothed belt for accomplishing this reduction in action.

This embodiment of FIG. 2 is particulary well suited for a remote control with the aid of a remote control board 33. An extremely simple maneuver is made by the operator on pressing the key according to the easily understood symbols. Thus as shown at 33 in FIG. 2, the control enables the machine to steer the trailer in every direction; forwards, backwards, to the right and to the left, without any effort on the part of the user. It will be appreciated that when the symbol keys "front" and "to the right" are pressed simultaneously, the two motors 13 and 15 are simultaneously actuated. As a result, motor 33 moves the trailer forward and the motor 15 makes the shaft 1 pivot to the right. An advantage of remote control unit 33 is that the user may control the maneuvers of all the positions while having complete visibility about the trailer. It will be further appreciated that the structural details of remote control unit 31 are well known; and that such units are commercially available.

In the event that the electric cable which connects remote control 31 to the machine becomes detached, a safety system is switched on, causing the machine to automatically stop.

The energy required for the operation of the present invention may be supplied by a 12 or 24 volt automobile type battery (not shown) which is located on the trailer and recharged, for example, by the alternator of the towing vehicle.

In an alternative embodiment, electric motor 13 may be replaced by an internal combustion engine of which a second power take-off has to be coupled to reducer 15, possibly with the aid of a flexible drive.

The maneuvering device of the present invention has many important features and advantages. For example, when guided by the driver, the present invention is able to push or pull the trailer in all directions without great effort on the part of the driver. In addition, the speed is advantageously adjusted to a value near that of walking pace.

It will be appreciated that other accessories may also be provided to the maneuvering device of the present invention such as a headlight 51 (see FIG. 1) or the like. Similarly, the present invention contemplates the use of any suitable and known method for fixing or attaching the maneuvering device of the present invention to the trailer drawbar.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A motorized device for maneuvering trailers detached from a towing vehicle, the trailers including a drawbar, comprising:
    a vertically adjustable shaft attachable to the drawbar of a trailer, said shaft having opposed upper and lower ends;
    at least one wheel mounted on said lower end of said shaft, said wheel having an axis perpendicular to said shaft;
    at least one driving means for driving said wheel in rotation about said wheel axis, said driving means comprising driving motor means and speed reducer means mounted on said upper end of said shaft wherein said speed reducer means transmits rotary movement to said wheel;
    swivelling means for swivelling said wheel, said swivelling means comprising a handle or manual steering wheel operatively connected to said driving motor means; and
    said shaft further comprising;
    a hollow casing vertically adjustable and adapted for attachment to the trailer drawbar; and
    a rotatable pin in said casing, said pin transmitting the rotary movement of said driving means to said at least one wheel.

2. The device of claim 1 wherein said driving motor means is electric.

3. The device of claim 1 wherein said driving motor means is an internal combustion motor.

4. The device as claimed in claim 1 including:
    auxiliary power take-off means.

5. The device as claimed in claim 1 including:
    a headlight on said shaft.

* * * * *